(12) United States Patent
Hossepian

(10) Patent No.: US 10,185,518 B1
(45) Date of Patent: Jan. 22, 2019

(54) SYSTEMS, PROCESSES, AND COMPUTER PROGRAM PRODUCTS FOR PAGE ORDERING OF PRINT JOBS

(71) Applicant: KYOCERA Document Solutions Inc., Osaka (JP)

(72) Inventor: Nishan Hossepian, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/954,148

(22) Filed: Apr. 16, 2018

(51) Int. Cl.
  *G06F 3/12* (2006.01)
  *H04N 1/393* (2006.01)

(52) U.S. Cl.
  CPC .......... *G06F 3/1204* (2013.01); *G06F 3/1243* (2013.01); *G06F 3/1252* (2013.01); *G06F 3/1256* (2013.01); *H04N 1/393* (2013.01)

(58) Field of Classification Search
  CPC .............................. H04N 1/393; G06F 3/1208
  See application file for complete search history.

(56) References Cited

U.S. PATENT DOCUMENTS

| | | | | |
|---|---|---|---|---|
| 2004/0205603 | A1* | 10/2004 | Nguyen | G06F 17/211 715/234 |
| 2008/0151322 | A1* | 6/2008 | Morales | H04N 1/387 358/448 |
| 2016/0110144 | A1* | 4/2016 | Bandyopadhyay | G06F 3/1252 358/1.18 |
| 2016/0182751 | A1 | 6/2016 | Kido | |

* cited by examiner

*Primary Examiner* — Ibrahim Siddo
(74) *Attorney, Agent, or Firm* — Alexis J. Saenz

(57) ABSTRACT

A system and method provide an improvement to ordering pages for a multi-page print job. In an exemplary embodiment, a user interface includes a layout control feature which when engaged, invokes an underlying process that computes which pages are to be initially imposed onto a sheet, and thereafter, based on an increment value assigned to one or more of the pages entries, automatically imposes pages (and their content) to the page order for the print job. Page entries may have different increment values and thus a non-sequential and/or heterogenous page output may result alleviating the user from having to individually manually assign each page to a print position in the print job.

20 Claims, 8 Drawing Sheets

SYSTEMS, PROCESSES, AND COMPUTER PROGRAM PRODUCTS FOR PAGE ORDERING OF PRINT JOBS

CROSS-REFERENCE TO RELATED APPLICATION

None.

FIELD

The subject disclosure relates to image processing and more particularly to systems, processes, and computer program products for page ordering print jobs.

BACKGROUND

Page ordering is defined as the placement of job pages into cells on a multi-up imposed sheet of paper to achieve various outcomes. Many standard algorithmic page ordering operations exist and are in wide use in the production printing realm. Examples include: Step and Repeat, Step and Increment, Cut and Stack, Booklet, etc. As varied and robust as these algorithmic approaches may be, they cannot address every specialized customer requirement.

Typically, customized print jobs require manual page ordering of pages. The user must specify on a page by page basis, exactly which page follows which other page in a print job. This is a tedious and time-consuming endeavor for projects that are several pages and the time consumption (as well as potential for error) is only magnified as the page count grows.

As can be seen, there is a need to improve on the process to manually order pages in a print job.

SUMMARY

In one aspect of the disclosure, a method of ordering page content for a print job comprising a plurality of sheets, by a computer processor comprises generating an electronic print job template for one or more sheets; dividing a base sheet template into a plurality of cells; assigning a page number to each cell in each of the one or more sheets in the print job; retrieving from a memory module, a first print content; assigning the first print content to a user selected one of the cells; receiving from the user a page increment value assigned to the first print content; and assigning the first print content to the page number of the user selected cell and to any additional pages within the one or more sheets based on the page increment value.

In another aspect, a computer program product to order page content for a print job comprising a plurality of sheets comprises a non-transitory computer readable storage medium having computer readable program code embodied therewith. The computer readable program code is configured, when executed by a processor, to: generate an electronic print job template for one or more sheets; divide a base sheet template into a plurality of cells; assign a page number to each cell in each of the one or more sheets in the print job; retrieve from a memory module, a first print content; assign the first print content to a user selected one of the cells; receive from the user a page increment value assigned to the first print content; and assign the first print content to the page number of the user selected cell and to any additional pages within the one or more sheets based on the page increment value.

In yet another aspect, image rendering computing device comprises a memory module; and a processor in communication with the memory module. The processor is configured, via a set of executable instructions stored in the memory module, to: generate an electronic print job template for one or more sheets, divide a base sheet template into a plurality of cells, assign a page number to each cell in each of the one or more sheets in the print job, retrieve from the memory module, a first print content, assign the first print content to a user selected one of the cells, receive from the user a page increment value assigned to the first print content, and assign the first print content to the page number of the user selected cell and to any additional pages within the one or more sheets based on the page increment value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1A:
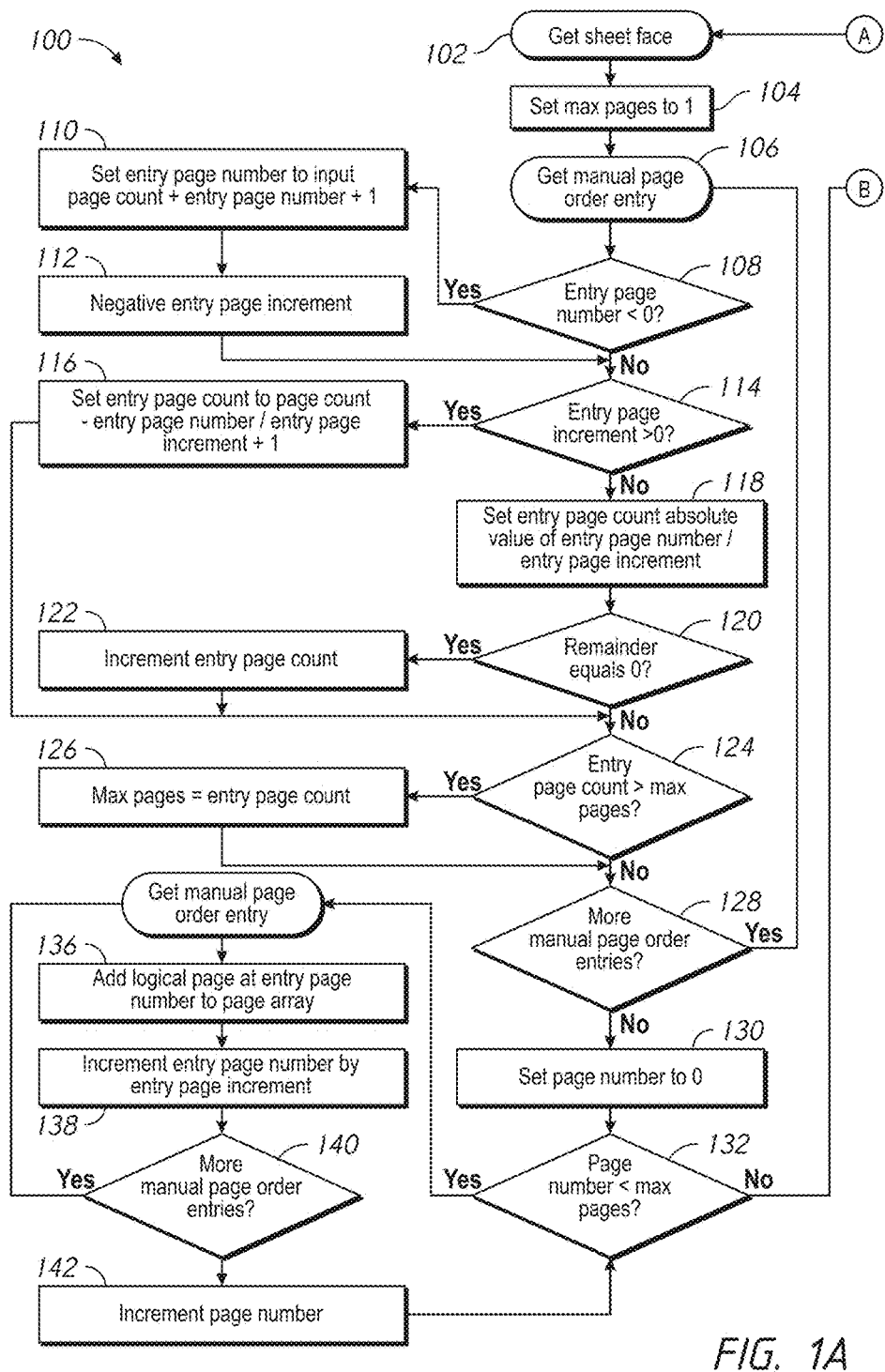
FIGS. 1A and 1B are a flowchart of a method of improving the ordering capabilities of page ordering in a multi-page print job in accordance with an embodiment of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of image rendering and printing.

Generally, embodiments of the subject technology improve on the field of digitally based printing. Aspects of the subject technology encompass an automated process, implemented through a user interface control, by which the user may specify their own page ordering scheme by specifically designating which job pages go into which cells of the imposed digital sheet through a configuration step. While completely manual page ordering onto the sheet is known in the field of imposition area configuration, this disclosure adds an automation element to the approach heretofore unaddressed. The configuration element entails user-mapping of page numbers into cells coupled with an 'increment' value. Pages are automatically placed into the cells using the initial values and then, once the list of mappings is exhausted, the initial values may be incremented by each coupled increment value and the process repeats until all job pages have been placed in sheet cells.

Embodiments include a user interface that provides a process-based control function that allows the user to manually order the occurrences of images by page numbers. As will be appreciated, an example result produces a print job that can be customized with varied print image output on the cutting sheet. One of ordinary skill will see that this is an improvement over previous systems that are limited to repeating for example, the same first image on a first side of the sheet accompanying a repeating same second image on a second side of the sheet. Unlike the prior art, aspects of the embodiments disclosed below can produce for example, varying instances of images on a first side of a sheet accompanying an in-common (same) image on the second side of each page (for example, business cards with different contact information for different people in a company on a first side of the cards but the same business slogan and graphics on the back side of everyone's cards). Or for example, should a print request require a varying number of occurrences for specified image objects, the print job may increment each image to satisfy the ratio of occurrences for one image to another image. In another aspect that will be appreciated, the underlying process generates and automatically positions pages and their respective image objects in repeated, non-sequential order, if necessary so that the user does not need to manually and individually locate and designate a page for each image entry in the final print job.

In an exemplary embodiment, the coupled increment values can be positive, negative (acting as decrement) or zero; which would essentially describe a page to be repeatedly mapped. In some embodiments, page numbers may also be negative which then describes a page offset from the end of the input job (for example, "−1" as an increment value may be interpreted by the system as "last page"; "−2" as an increment may be interpreted as, "second to last", etc.). For example: a customer may wish to print business cards with a common company logo on the back of each card. The input document has 21 pages with the company logo card face (back) as page 1. Pages 2-21 contain the individualized card faces (front). Under aspects of the subject technology, the customer defines a 4-up imposition layout. For a sheet with 8 cells, the configuration would be as described as in the following table: Page Increment 2, 4, 3, 4, 4, 4, 5, 4, 1, 0, 1, 0, 1, 0, 1, 0. The first output sheet would contain card pages 2-5 on the front (non-sequentially) and page 1 repeated 4 times on the back. The page numbers are then incremented by the specified increment value for the next sheet (pages 6-9; front, page 1, 4x; back). This process continues until all 21 pages have been placed onto sheets (in this example, with 21 pages, the process of positioning individual pages, four to a sheet with one common page to each back side, will require 5 sheets total). In one aspect, the user only has to map the first sheet and the underlying process maps the subsequent sheets by use of the incrementors.

An "image object" or "image" may be for example, text and/or graphics. In general, a "print job" may refer to a single image shown on multiple pages, or multiple pages of differing images. A "logical page" may refer to the digital representation of the image object(s) that will be rendered onto a digital or physical page number. As used below, a "print job" may sometimes be referred to as an image object since the rendering of the print job is shown as an image within the user interface preview space. As "print jobs" are requested, aspects of the embodiments disclosed may compile multiple "print jobs" into a single overall "print job" project, "print project", or "print publication" laid out onto a sheet or series of sheets that will be assembled into an overall publication. In an exemplary embodiment, a print job will be described in the context of a multi-page document forming for example, a sheet with multiple pages that may be cut vertically and/or horizontally to extract the individual pages. In a further embodiment, the sheet may be double-sided so that pages may be printed on both sides of the sheet.

For the following flowchart, steps of the processes may be referred to as blocks and/or by reference numeral shown in parentheses. As will be described further below, steps may be performed by a machine, for example, a computing device, an image forming apparatus, and/or a processing unit. While the steps may be described in one order, it will be understood that variations to the order may be practiced or the order in which claims below are written may vary from the following without departing from the scope of the invention.

Figure 1B:
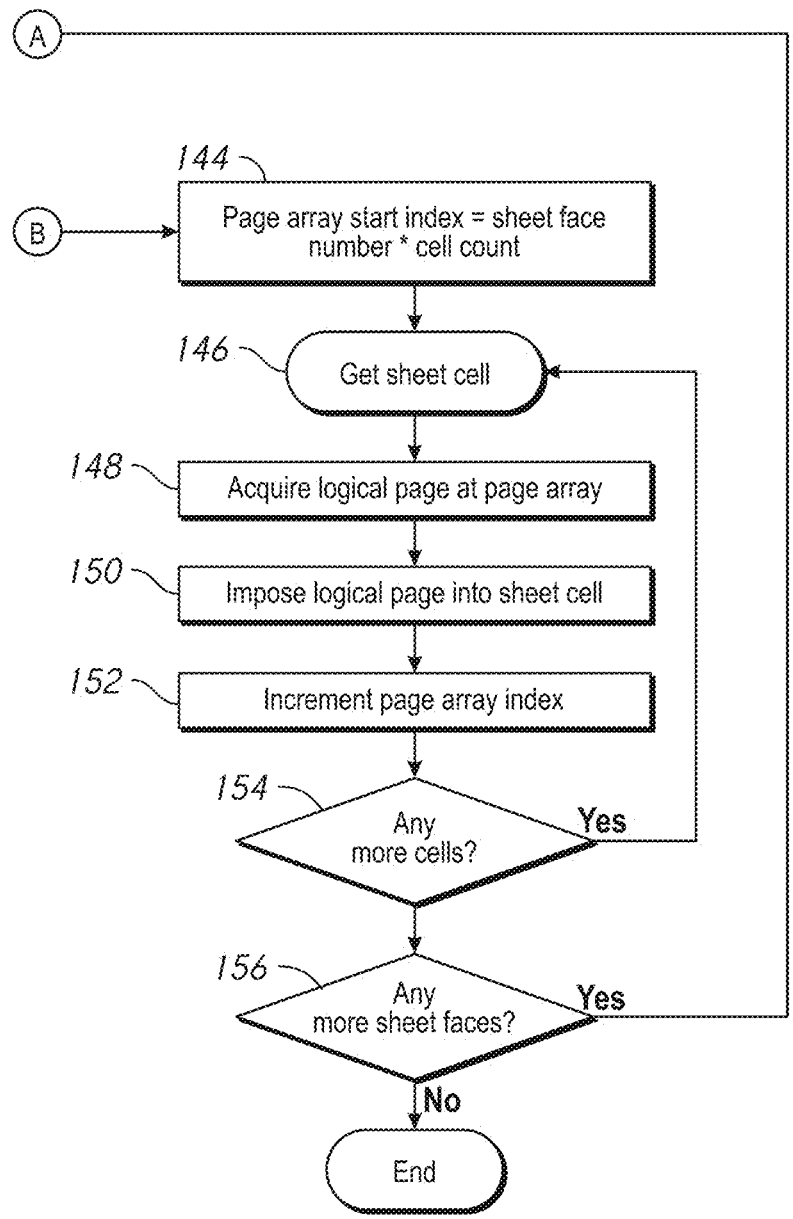

Referring now to FIG. 1, a method 100 of semi-automatic page ordering in a multi-page print job is shown according to an exemplary embodiment. In some aspects, for ease of reading, reference to FIGS. 2-5 may be made where examples of inputting page order data into a user interface and the resultant output are shown which may reflect one or more steps in the method 100. Moreover, while some steps in the method 100 may refer to actions received by user input into a user interface, other steps may reflect actions executed in the background of a computing environment (the details of which are described below with respect to FIGS. 6-8. In that respect, steps may be referred to as being executed by the "system" which may include solely an individual computing device, a computing device connected to another computing device, or a computing device connected to an image rendering/printing apparatus.

Figure 2:
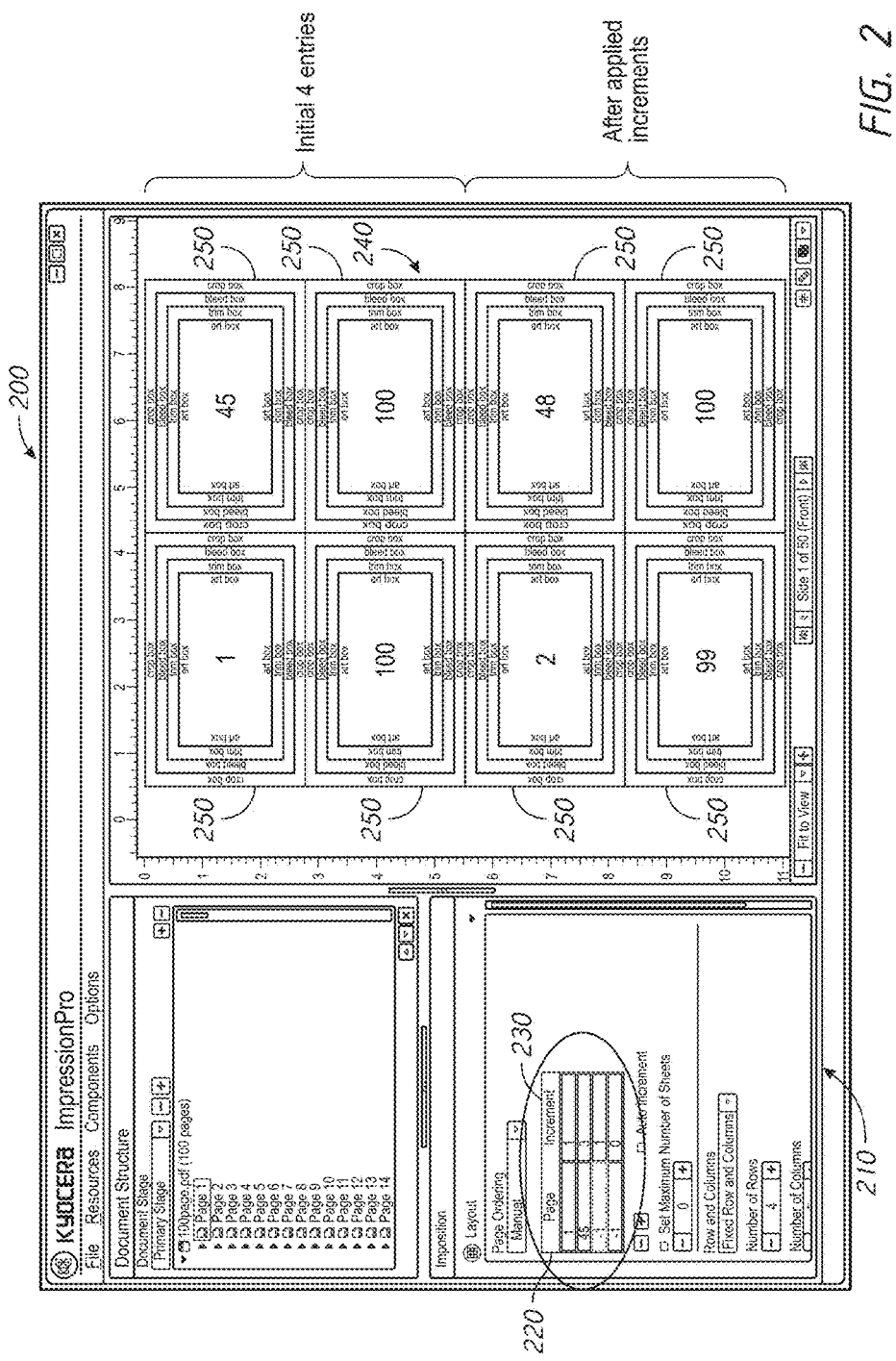
FIG. 2 is a screenshot of a user interface for controlling imposition within a multi-page print job along with a control function for manually setting the page ordering of pages in accordance with embodiments of the subject technology.

For a user interface (UI), (for example, the UI 200 of FIGS. 2-5), the system may retrieve (102) a sheet face. The sheet face may be a digital representation of the end output for the sheet shown in a print preview pane of the UI 200 (FIG. 2). The sheet face may be either the front side or back side of the sheet. Any conditions entered into the UI may be relative to the side being shown. The maximum number of pages may be set (104) to 1 (as an initial value to work against once more pages are entered into the print project). The system may receive (106) a manual page order entry from a user. In FIG. 2, this may be seen in layout control interface 210. The layout control interface 210 may include a manual page order entry field 220 and an increment field

230. A determination (108) of whether the page number received is less than "0" may be performed.

For page entries less than "0", the system sets (110) the page number entry to the input page count plus the page number entry value plus "1". The input page count is the number of pages in the "source" document. For example, if one wanted to make a folded booklet from a 100-page PDF ("input page count"=100), the resulting booklet would use 25 sheets of paper (two pages per sheet face*2 sides of the sheet). However, one should bear in mind that the intent of a "page entry" that is less than "0" is to provide a relative reference from the end of a source page document, and for that, the algorithm needs the "input" or "source" page count. For example, the system may then increment (112) a negative page entry value (if needed).

After being set to a negative increment or if the page number entry was not less than "0", the system may determine (114) if a page increment value (entered for example, in field 230 (FIG. 2)), was greater than "0". If so, the system may set (116) the entry page count to the page count minus the entry page number value divided by the sum of the entry page increment plus "1". If not, then the system may set (118) the entry page count to the absolute value of the entry page count number divided by the entry page increment. Then, the system may determine (120) if the remainder is "0". If so, the system may increment (122) the entry page count. If not, or after the increment step (122), the system may determine (124) whether the entry page count is greater than the maximum pages value. If greater than the maximum pages value, then the maximum pages value may be set (126) to the entry page count value. Otherwise, the system may determine (128) whether there are more manual page order entries. For example, field 220 in FIG. 2 shows four manual page entries ("1", "45", ("−1"), and ("−1"). With additional manual page order entries, the process reverts back to step (106) of receiving a manual page order entry and the subsequent steps are invoked as needed until all the manual page entries are processed. Then the system sets (130) the page number to "0". The system may determine (132) if the page number, (referring to the current sheet face under construction) received is less than the maximum page value.

If the page number is less than the maximum page value, then the system may receive (134) the manual page order entry. In FIG. 2, an exemplary embodiment shows an array 240 of cells (representing a sheet from which individual pages will be cut) onto which 8 individual logical pages 250 are logically positioned for the print job. The system may add (136) the logical page at the entry cell for the page number to the page array. As can be seen, logical page "1" is placed into its cell.

The system may then refer to the increment value associated with each page entry value. The system may increment (138) a page entry by its increment value. As shown in the example, page "1" has an associated increment value of "1", thus the next logical page (after the manual page order entries), that will be placed onto the sheet (or next sheet if necessary) is page "2".

The system may determine (140) whether more manual page order entries are available. If so, then the page entry computation steps and increment value for each other page entry is performed. For example, FIG. 2 shows three other page entry values and associated increment values. Page "45" is computed for placement in the next cell after page "1". Page entry values ("−1") as described earlier may be interpreted as the last page. Referring to the "Document Structure" window above the control interface 210, one may see in this example that the print job includes 100 pages total. Thus, the entry value ("−1") represents page 100 for the next two entries.

Page "45" has an increment value of "3" so the next logical page placed in the array will be page "48". The first page entry value ("−1") (page 100) has an associated increment value of "1", thus the next logical page is page "99". As will be appreciated, the executable instructions associated with this feature solve the problems of the prior art (that are limited to complete manual mapping techniques or step and repeat of homogenous patterns) by automatically mapping the imposition of pages for the user according to varying values. Note that in some embodiments, a negative page entry value may also indicate to the system the direction of order so that ("−1") may be interpreted as starting at the last page and incrementing in the same direction. This is consistent with the description of steps (114) and (118) described above. For example, if you start with a negative page entry and use a negative increment, (e.g. page −1 and increment −1), then the next page would be page +1. As may be appreciated, for a savvy user, the feature provides flexibility in customizing the page order. A negative page number used with a negative page increment effectively counts forward. So, for a 100-page document, −2 for a page number entry refers to page 99 and a −1 for a page increment means the next page will be 100 (page+1). This "correction" is seen in step 112. The intent was to provide a notion of incrementing "from the end" for the user rather than to apply the mathematical truth of "negative+negative=negative". The second page entry value ("−1") (page 100) has an associated increment value of "0" and thus the logical page number "100" is computed as the last entry. Once there are no more additional manual page order entries, page numbers, (referring to the current sheet face under construction) are incremented (142) until the page number is no longer less than the max page value.

The system may then calculate (144) the page array start index equal to the sheet face number times the cell count. For example, for a first sheet with 8 cells, the index value is 8. The second sheet last cell would be a value of 16 and so on. The system may retrieve (146) the sheet cell, for example, the first cell or thereafter. The system may acquire (148) the logical page for the page array from system memory; for example, page "1". The system may impose (150) the logical page retrieved from memory into the sheet cell. For example, page "1" into cell 1 as shown. The system may increment (152) the page array index until all cells are accounted for at which point, if no more cells are available (154), then the system determines (156) whether anymore sheet faces are available to populate. So according to the previous steps, the next cell will impose page "45". Then based on increment values, the next cell will impose the result of page "1" incremented by 1, which will be page "99". The next cell will be imposed with page "45" incremented by the value of 3, the result of which is page "48". The next cell represents page "100" incremented by 1, which as described above may be in the opposite direction, the result of which shows page "99". The last cell is page "100" which is not incremented because of the value "0". If sheets remain available, the method reiterates the process from the beginning for each sheet. Otherwise, the print job is ready and the process terminates.

Figure 3:
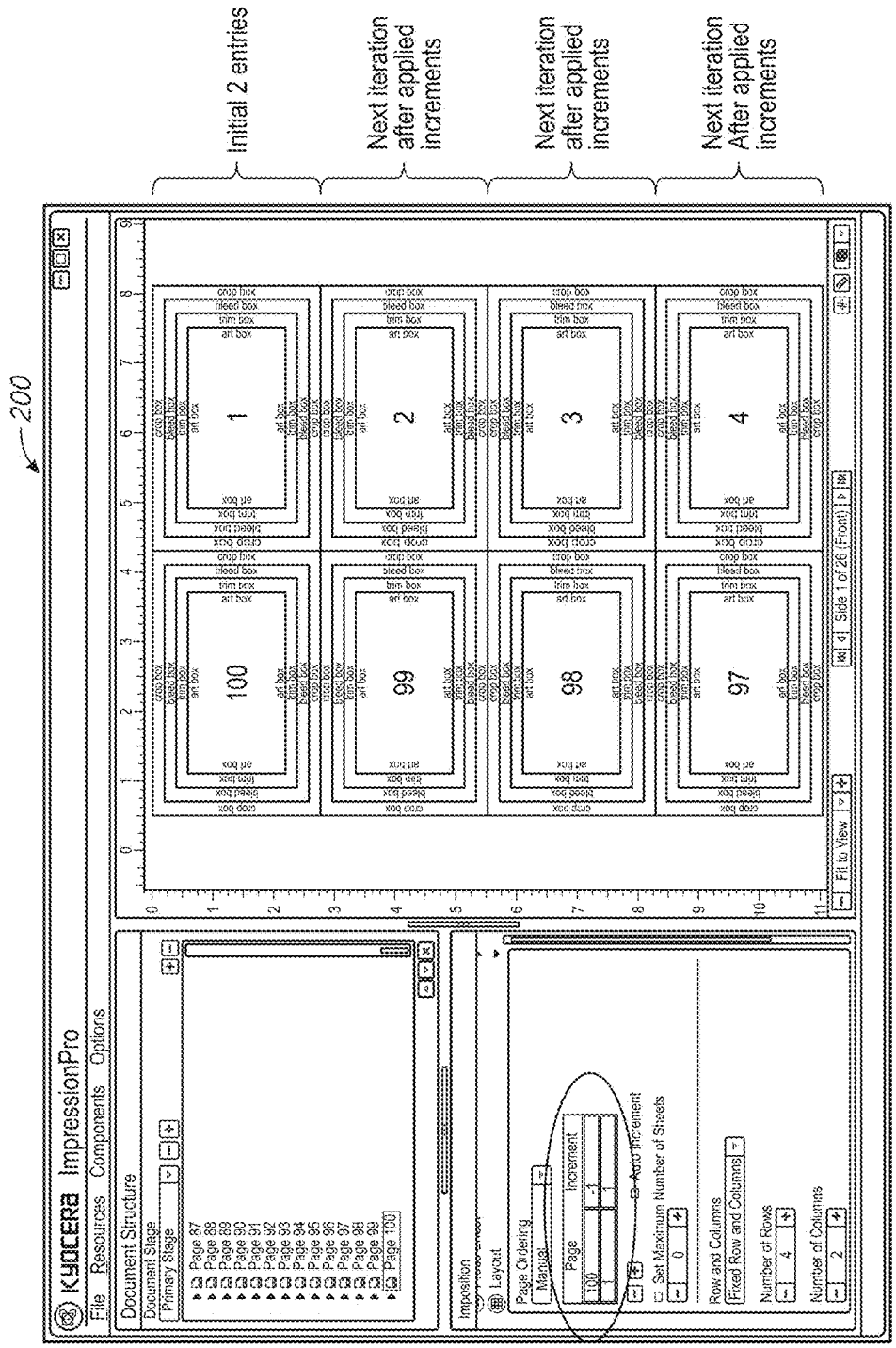
FIG. 3 is a screenshot of the user interface of FIG. 2 with a different page order and increment setting than FIG. 2 in accordance with embodiments of the subject technology.
Figure 4:
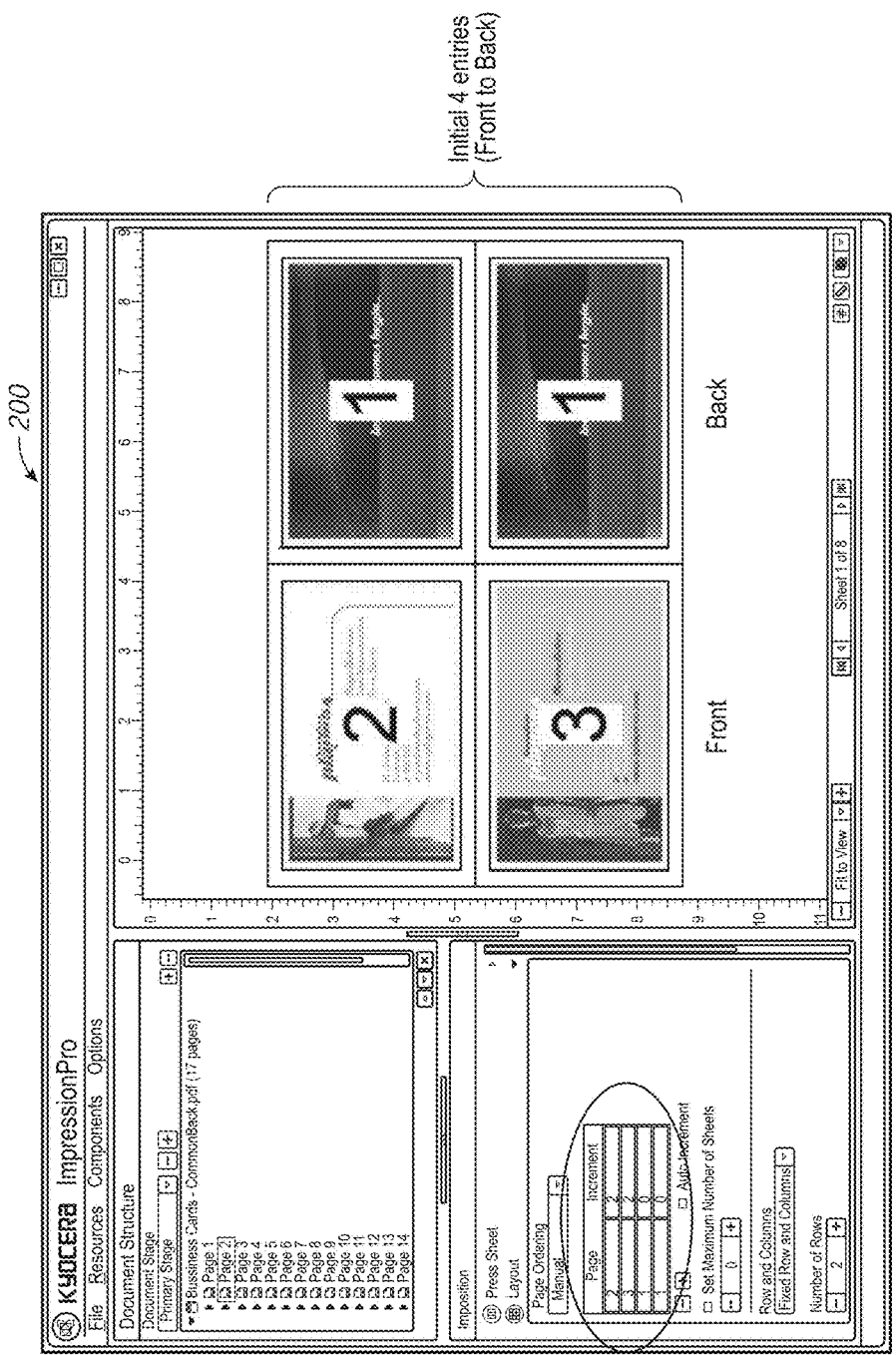
FIG. 4 is a screenshot of the user interface of FIG. 2 with a different page order and increment setting than FIG. 2 and print previews of print job pages in accordance with embodiments of the subject technology.
Figure 5:
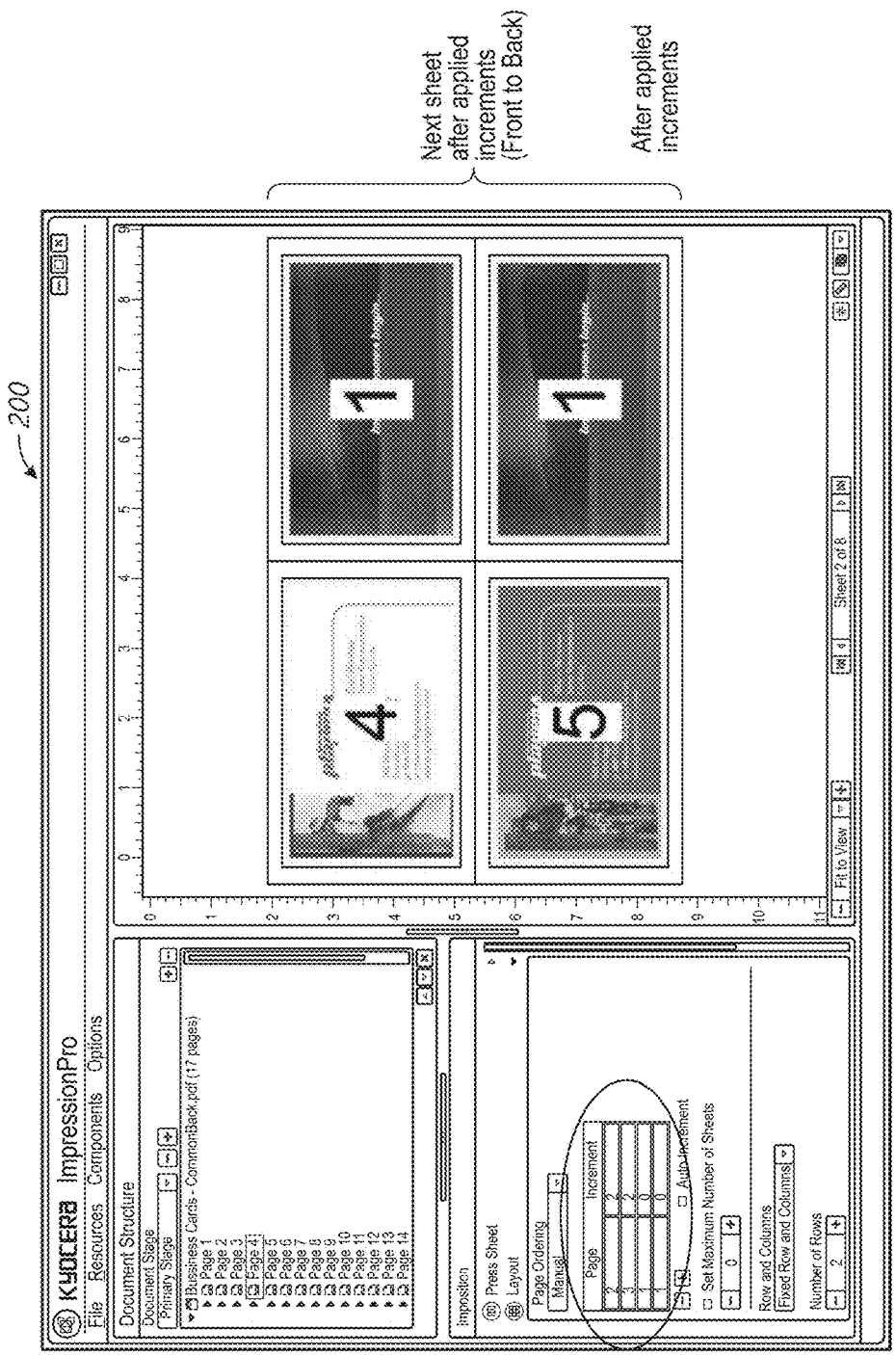
FIG. 5 is a screenshot of the user interface of FIG. 4 with a print preview showing a different sheet of pages than FIG. 4 after incrementation values are applied to the page order in accordance with embodiments of the subject technology.

FIGS. 3-5 show the UI 200 under varying received manual page order entries and increment entered value results. These scenarios, as will be appreciated, demonstrate the flexibility provided by the process embodiments described above. Various imposition results are achievable for customized print jobs because the features above allow the system to map out and impose pages under one or more patterns based on the user's needs. FIG. 3 shows a scenario with two pages of entries ("1" and "100"). For a sheet of 8 cells, there are 3 iterations that follow after the initial page entries are imposed. The print job is setup so that each page after page "100" is an incremented value down by 1 from 100. The next cells increment up by one value from page "1".

FIGS. 4 and 5 show an example of the UI 200 with the logical pages displaying the actual page content. In some embodiments, the page number may be displayed superimposed on the page content of each cell. In this instance, the sheet has a maximum of 2 rows (as configured by the user in the UI 200) and 4 cells are available per sheet. FIG. 4 also shows that the first column of cells may represent front side pages while the second column may represent back sides of the print output. As setup by user entry, FIG. 4 displays an example of the business card scenario described above which includes individual front sides with a common backside of the business card carrying a slogan for the in-common business affiliation. The initial page entry values begin with pages "2" and "3" each incremented by a value of 2 for subsequent pages to be printed. The backside includes an initial page entry value of "1" which will not be incremented (represented by value "0"), and thus each business car will have the same page content printed on the back of the card. FIG. 5 shows the next iteration of front side page values incremented by a value of 2 (page "2" to page "4" and page "3" to page "5"), for the next sheet once the first sheet's cells are all accounted for and imposed upon.

As will be further appreciated, for a voluminous print job including many different pages (for example, imagine a company with one hundred employees (or more!) but each with varying needs for business card amounts (some such as a salesperson may need thousands of cards while someone more on the support side may need only a few hundred). Rather than order separate print jobs for each individual employee, aspects of the above disclosure allow one to retrieve every employee's data and print in a single job, the number of cards needed for each by input of the increment value feature.

Figure 6:
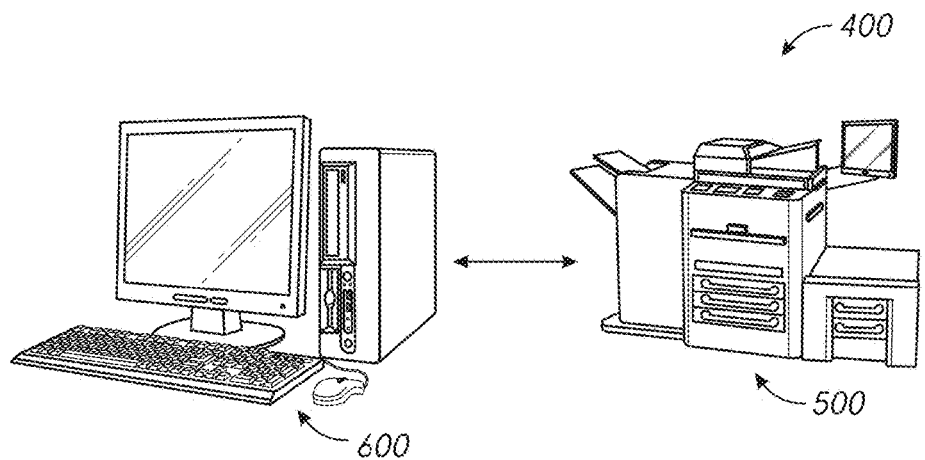
FIG. 6 is a schematic of a print job system in accordance with an embodiment of the subject technology.
Figure 7:
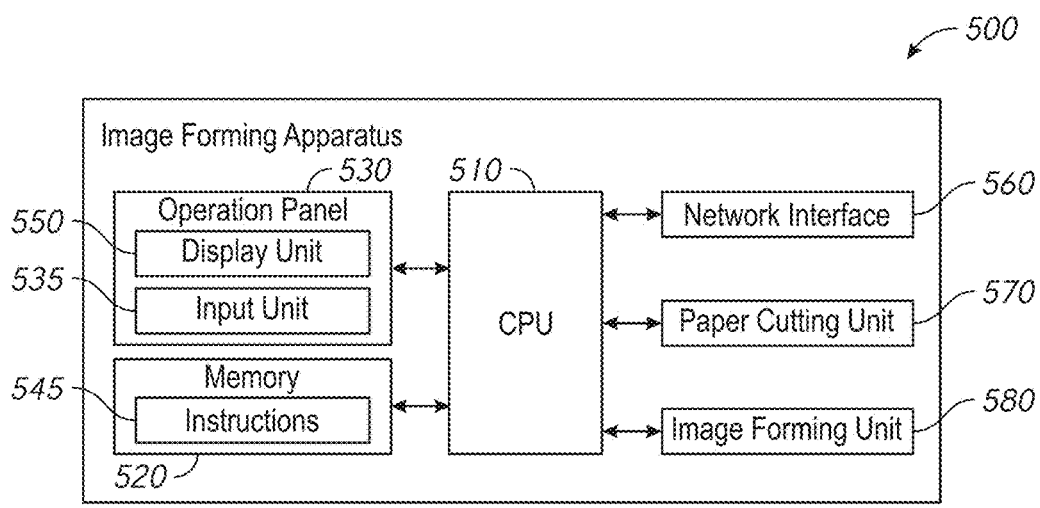
FIG. 7 is a block diagram of an image forming apparatus in accordance with an embodiment of the subject technology.
Figure 8:
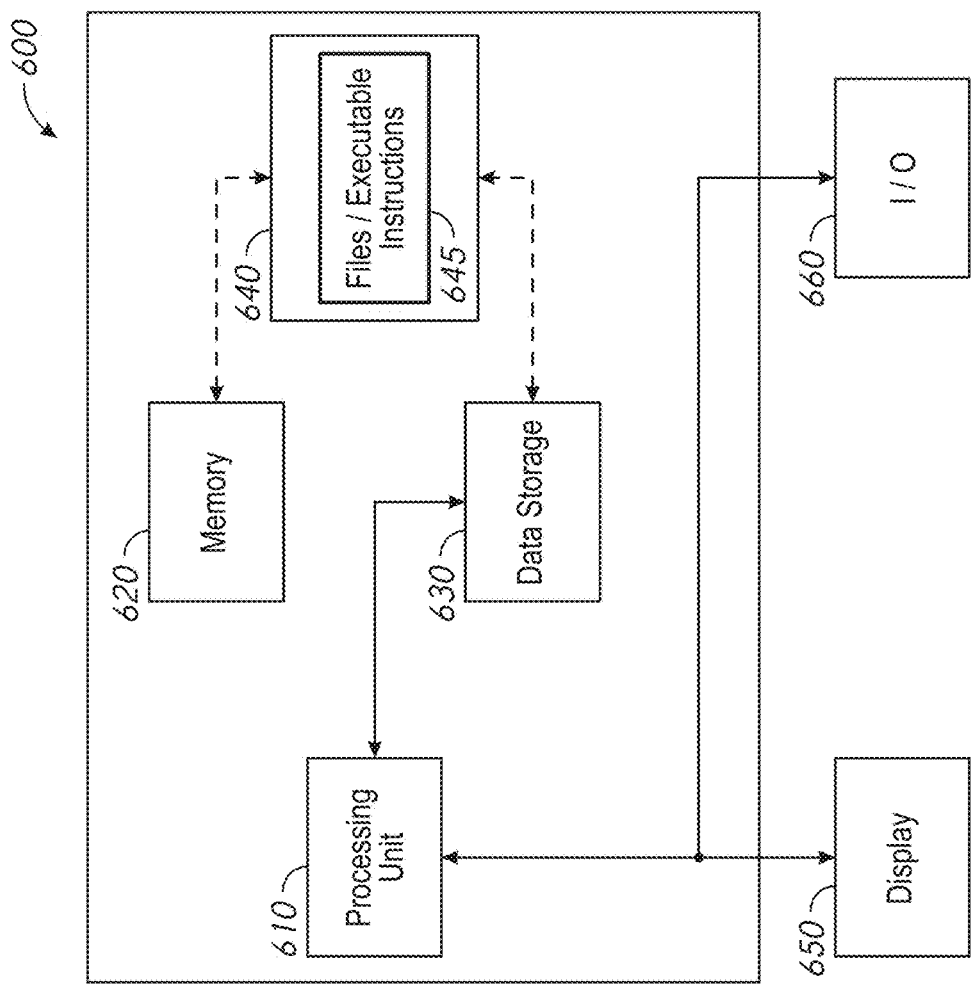
FIG. 8 is a block diagram of a computing device in accordance with an aspect of the subject technology.

Referring now to FIGS. 6-8, system and machines of the subject technology are shown according to exemplary embodiments. A system 400 is shown in FIG. 6 which may include an image forming apparatus 500 connected to a computing device 600. In some embodiments, the above described process(es) may be loaded as executable instructions into one or both of the image forming apparatus 500 and the computing device 600. FIG. 7 shows a schematic example of the image forming apparatus 500. FIG. 8 shows a schematic example of a computing device 600. In general, the process(es) above may be implemented by either or both the image forming apparatus 500 and the computing device 600. In addition, it will be understood that multiple instances of the computing device 600 may be connected to the same image forming apparatus 500, however, for sake of illustration, a single computing device 600 is shown. In some embodiments, the image forming apparatus 500 and/or the computing device 600 may include software embodiments, which may provide the digital preview of print sheets with pages laid out according to the embodiments described above. The preview may be saved as a file which may be stored, transferred, and recalled for future print requests.

The image forming apparatus 500 may be for example, a computing-based image processing and printing device that can receive print job requests (for example, a printer, a fax machine, a copier machine). The components of the image forming apparatus 500, may include, but are not limited to, one or more processors or processing units 510, a system memory 520, an operation panel 530, an input unit 535, a set of program modules 545 including files and executable instructions, a display unit 550, a network interface 560, a paper cutting unit 570, an image forming unit 580, and a bus system that couples various system components including the system memory 520 to the processor(s) 510. The memory storage 520 may store for example, executable instructions and/or electronic versions of the image objects to be printed. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications (like those related to rendering the image objects into print jobs on the sheet/page space described above) either alone or in coordination with other general processor 510 types such a CPUs, microchips, and the like.

The computing device 600 may be for example, a computer system or a computer server. In some embodiments, the image forming apparatus 500 may be another example of a computing device 600. As will be appreciated, some aspects of the embodiments disclosed above may turn the computing device 600 into a special purpose computer system. For example, in the role of a host server, the computing device 600 may implement for example the functions of storing electronic image object files with connected users and their workstations. More particular to this disclosure, as a host server, the computing device 600 may receive and store print job requests and impose pages onto a print sheet according to the process(es) described above. In the role of a user device, the computing device 600 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics.

The components of the computer system or server, may include, but are not limited to, one or more processors or processing units 610, a system memory 620, data storage 630, a computer program product 640 having a set of program modules 645 including files and executable instructions, and a bus system that couples various system components including the system memory 620 to the processor (s) 610. The memory storage 620 may store for example, electronic files of the image objects to be printed. In some embodiments, the processors 610 may include a processing unit dedicated to graphics and image processing (for example a graphics processing unit (GPU) or visual processing unit (VPU). As a GPU or VPU, the processor 610 may implement executable instructions focused on image processing applications (like those related to converting unrendered image content data imposed onto sheets under the page increment processes as described above) either alone or in coordination with other general processor 610 types such a CPUs, microchips, and the like.

The computing device 600 may be described in the general context of computer system executable instructions, such as the program modules 645 which represent a software embodiment of the system and processes described generally above with respect to FIG. 1. The program modules 645 generally carry out the functions and/or methodologies of embodiments as described above. The computing device 600 may typically include a variety of computer system readable media. Such media could be chosen from any available media that is accessible by the computing device 600, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 620 could include one or more computer system readable media in the form of volatile memory, such as a random-access memory (RAM) and/or a cache memory. By way of example only, the data storage system 630 may read from and write to a non-removable, non-volatile magnetic media device. The system memory 620 may include at least one program product 640 having a set (e.g., at least one) of program modules 645 that are configured to carry out the functions of embodiments of the invention in the form of computer executable instructions. The program product/utility 640, having a set (at least one) of program modules 645, may be stored in the system memory 620 by way of example, and not limitation, as an operating system, one or more application programs, other program modules, and program data. Some embodiments may generate an electronic user interface (viewable and controllable from the display unit 550 or display 650) that may allow the user to enter image objects for processing and as described above, control the imposition of pages and manually impose other pages into an order via increment values onto a print sheet (even though embodiments are generally considered automated and positioning may primarily be performed by the processing unit(s) 510 and/or 610).

The computing device 600 may communicate with one or more external devices including for example, an electronic display 650 which may in some embodiments be configured for tactile response as in a touch screen display. User input into the display 650 may be registered at the processor 610 and processed accordingly. Other devices may enable the computing device 600 to communicate with one or more other computing devices, either by hardwire or wirelessly. Such communication can occur via Input/Output (I/O) interfaces/ports 660. In some embodiments, the I/O interfaces/ports 660 may be specially configured to handle aspects of the embodiments described herein converting the computing device 600 into a special purpose machine. For example, as a printer, the I/O interfaces/ports 660 may be configured to transmit receipt of the image objects with their respective metadata for use in determining optimum page incrementation given the input page count. The printer 500 as a standalone computing device (or as connected to the computing device 600) may be dedicated to printing and cutting jobs under the imposition criteria provided by the UI 200 of FIG. 2. The I/O interfaces/ports 660 may also include printing modules (for example, ink jet print heads, laser print systems, etc.) for rendering a physical embodiment of page sheets imposed with image objects optimally incremented according to the manual page ordering.

The computing device 600, through the I/O interface/ports 660, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 600 may be a cloud computing node connected to a cloud computing network (not shown). The computer computing device 600 may be practiced in distributed cloud computing environments where tasks are performed by remote processing devices that are linked through a communications network. In a distributed cloud computing environment, program modules may be located in both local and remote computer system storage media including memory storage devices. Thus, members contributing to for example, the overall system being developed described above may provide software modules to the computing device 600 which may hold electronic files and copies in more than one physical location, each of which may be referenced and/or may trigger automated processes (for example, once a threshold number of print job requests are received).

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 650 which may be controlled via direct contact with the display 650 or via the I/O interfaces 660 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 610 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some"

refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of ordering page content for a print job comprising a plurality of sheets, by a computer processor, comprising:
   generating an electronic print job template for one or more sheets;
   dividing a base sheet template into a plurality of cells;
   assigning a page number to each cell in each of the one or more sheets in the print job;
   retrieving from a memory module, a first print content;
   assigning the first print content to a user selected one of the cells;
   receiving from the user a page increment value assigned to the first print content; and
   assigning the first print content to the page number of the user selected cell and to any additional pages within the one or more sheets based on the page increment value.

2. The method of claim 1, further comprising:
   retrieving from the memory module a second print content;
   assigning the second print content to a second user selected one of the cells;
   receiving from the user another page increment value assigned to the second print content; and
   assigning the second print content to the page number of the second user selected cell and to any additional pages within the one or more sheets based on the second page increment value.

3. The method of claim 2, wherein the step of assigning the first print content to any additional pages within the one or more sheets based on the page increment value is not performed until the step of assigning the second print content to the page number of the second user selected cell.

4. The method of claim 1, wherein the page increment value is a negative number.

5. The method of claim 4, wherein the negative number represents a page offset from the end of the print job.

6. The method of claim 1, wherein the second print content is not assigned to any pages that the first print content is assigned to.

7. The method of claim 1, wherein a page increment value of zero represents page content repeatedly assigned to any next cells not assigned to another print content.

8. A computer program product to order page content for a print job comprising a plurality of sheets, the computer program product comprising a non-transitory computer readable storage medium having computer readable program code embodied therewith, the computer readable program code being configured, when executed by a processor, to:
   generate an electronic print job template for one or more sheets;
   divide a base sheet template into a plurality of cells;
   assign a page number to each cell in each of the one or more sheets in the print job;
   retrieve from a memory module, a first print content;
   assign the first print content to a user selected one of the cells;
   receive from the user a page increment value assigned to the first print content; and
   assign the first print content to the page number of the user selected cell and to any additional pages within the one or more sheets based on the page increment value.

9. The computer program product of claim 8, further comprising computer readable code configured to:
   retrieve from the memory module a second print content;
   assign the second print content to a second user selected one of the cells;
   receive from the user another page increment value assigned to the second print content; and
   assign the second print content to the page number of the second user selected cell and to any additional pages within the one or more sheets based on the second page increment value.

10. The computer program product of claim 9, wherein the step of assigning the first print content to any additional pages within the one or more sheets based on the page increment value is not performed until the step of assigning the second print content to the page number of the second user selected cell.

11. The computer program product of claim 8, wherein the page increment value is a negative number.

12. The computer program product of claim 11, wherein the negative number represents a page offset from the end of the print job.

13. The computer program product of claim 8, wherein the second print content is not assigned to any pages that the first print content is assigned to.

14. The computer program product of claim 8, wherein a page increment value of zero represents page content repeatedly assigned to any next cells not assigned to another print content.

15. An image rendering computing device, comprising:
a memory module; and
a processor in communication with the memory module, the processor configured, via a set of executable instructions stored in the memory module, to:
generate an electronic print job template for one or more sheets,
divide a base sheet template into a plurality of cells,
assign a page number to each cell in each of the one or more sheets in the print job,
retrieve from the memory module, a first print content,
assign the first print content to a user selected one of the cells,
receive from the user a page increment value assigned to the first print content, and
assign the first print content to the page number of the user selected cell and to any additional pages within the one or more sheets based on the page increment value.

16. The image rendering computing device of 15, wherein the processor is further configured to:
retrieve from the memory module a second print content;
assign the second print content to a second user selected one of the cells;
receive from the user another page increment value assigned to the second print content; and
assign the second print content to the page number of the second user selected cell and to any additional pages within the one or more sheets based on the second page increment value.

17. The image rendering computing device of 16, wherein the step of assigning the first print content to any additional pages within the one or more sheets based on the page increment value is not performed until the step of assigning the second print content to the page number of the second user selected cell.

18. The image rendering computing device of 15, wherein the page increment value is a negative number.

19. The image rendering computing device of 18, wherein the negative number represents a page offset from the end of the print job.

20. The image rendering computing device of 15, wherein the second print content is not assigned to any pages that the first print content is assigned to.

\* \* \* \* \*